United States Patent Office 2,979,267
Patented Apr. 11, 1961

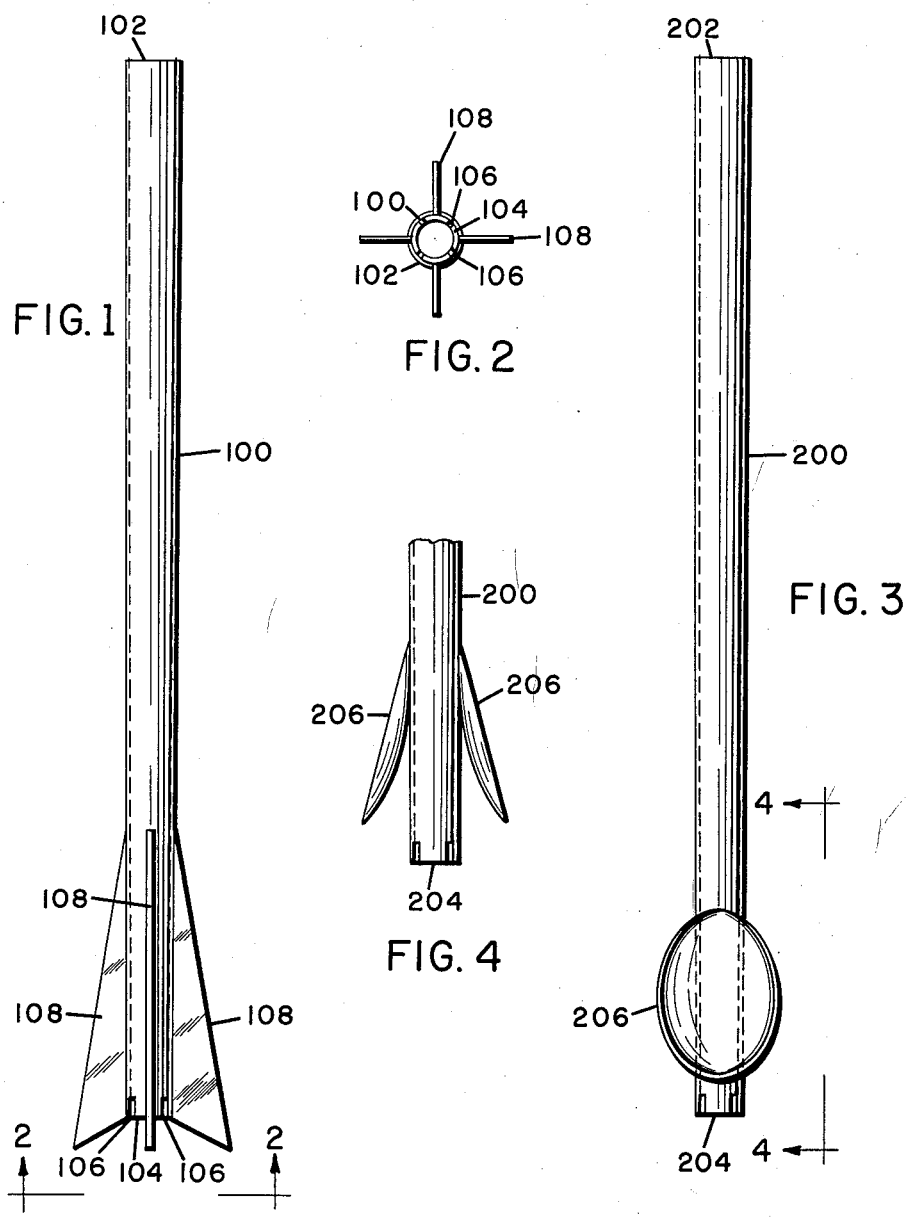

2,979,267

DRINKING TUBE

Frederick W. Miller, 5846 Bellona Ave.,
Baltimore 12, Md.

Filed June 18, 1958, Ser. No. 742,871

1 Claim. (Cl. 239—33)

This invention relates generally to beverage serving articles, and more particularly to a drinking tube or straw arrangement.

In the serving of frosted drinks which have a semi-solid consistency, it is customary to provide both a spoon and a drinking straw. The usage of the straw and spoon alternates between the consuming of the liquid, and the spooning and stirring of the less melted portion of the beverage. Inasmuch as both articles have a handle portion in effect, it is proposed to combine the two so that they complement their utility. Thus, with one utensil, for example, the ice cream in a milk shake can be broken up and stirred while the resulting liquid is being imbibed.

It is an object of this invention to provide a swizzle-stick drinking straw having mutually contributing usage.

Another object of this invention is to provide a spooning drinking tube.

To provide a combined drinking straw or tube and a spoon which is economical to manufacture, efficient and reliable in operation, and which is compact, are other objects of this invention.

These and other objects of the invention will become more readily apparent and understood from the accompanying specification and single sheet of drawings in which:

Fig. 1 is a vertical plan view of the novel swizzle-stick drinking straw incorporating features of this invention;

Fig. 2 is an end view of the drinking straw in the direction of the arrows 2—2 of Fig. 1;

Fig. 3 is a vertical plan view of another embodiment of the straw embodying features of the invention; and Fig. 4 is a fragmentary view taken in the direction of arrows 4—4 in Fig. 3.

In Figs. 1 and 2, there is illustrated a thin-walled tube 100 having an open upper end 102 and open lower end 104. Tube 100 is preferably made of plastic, cardboard, paper, glass, or equivalent material and may be of uniform diameter or tapered from the top end downwardly, with the largest opening being at the mouth end of the tube.

One or more slots or notches 106 may be cut into the lower end of the tube 100 as shown. Vanes 108 are cast-in or attached to the lower sides of tube 100. If these vanes are triangular-shaped, as shown in Figs. 1 and 2, in addition to serving as stirring appendages they may be used for chopping of the contents or cleaning of the contents from the wall of a container. It is apparent that when the tube 100 is twirled, the vanes 108 will serve to intermix the constituents or contents of the drink in the glass or container.

Notches 106 serve to prevent a seal should tube 100 rest on the bottom of a beverage container as well as to allow a more free entrance of semi-solid food particles if desired.

The taper of tube 100 downwardly prevents clogging of the tubing with the constituents in the container. Any solids entering the tube 100 are drawn upwardly into a gradually expanding space.

In Figs. 3 and 4, there is shown another embodiment of the invention. A tube 200 similar to tube 100 in the previous example is provided. Tube 200 has cemented-on or cast-in spoon shells 206 near its lower end 204. This utensil is also intended for sipping from its upper end 202 while stirring and it additionally serves to scoop up and convey the more solid food.

The novel swizzle-stick drinking tubes described in the foregoing specification can readily be mass-produced to result in an inexpensive, one use, disposable, useful article.

Obviously many other modifications and variations of the present invention are possible in the light of the above teachings. It is, therefore, to be understood that within the scope of the appended claim the invention may be practiced otherwise than as specifically described.

What is claimed is:

A drinking straw arrangement, comprising, structure defining a plastic internally tapered tube having the opposite ends thereof open, and a plurality of evenly spaced fin-shaped elements in the form of spoon shells provided integrally at one end of said tube, said one end of said tube also having slots provided therein and extending in the longitudinal direction of said tube from said one end thereof and positioned between said fin-shaped elements to prevent sealing of said tube.

References Cited in the file of this patent

UNITED STATES PATENTS

| | | |
|---|---|---|
| 32,361 | Hall | May 21, 1861 |
| 168,201 | Wharton | Sept. 28, 1875 |
| 478,861 | Howard | July 12, 1892 |
| 674,446 | Marx | May 21, 1901 |
| 2,613,107 | Hartnett | Oct. 7, 1952 |
| 2,815,981 | Nonnamaker et al. | Dec. 10, 1957 |